United States Patent [19]
Tanaka et al.

[11] Patent Number: 6,030,727
[45] Date of Patent: Feb. 29, 2000

[54] ALKALINE BATTERY SEPARATOR AND PROCESS FOR PRODUCING THE SAME

[75] Inventors: Masanao Tanaka; Nobutoshi Tokutake, both of Ibaraki, Japan

[73] Assignee: Japan Vilene Company, Ltd., Tokyo, Japan

[21] Appl. No.: 09/052,196

[22] Filed: Mar. 31, 1998

[30] Foreign Application Priority Data

| Apr. 3, 1997 | [JP] | Japan | 9-101073 |
| May 13, 1997 | [JP] | Japan | 9-139355 |
| May 13, 1997 | [JP] | Japan | 9-139356 |

[51] Int. Cl.$^7$ .................................................. H01M 2/16
[52] U.S. Cl. ......................... 429/250; 429/254; 427/222; 264/260
[58] Field of Search .................. 429/142, 250, 429/254; 264/260; 427/222

[56] References Cited

U.S. PATENT DOCUMENTS

| 4,264,691 | 4/1981 | O'Rell et al. | 429/250 |
| 5,354,617 | 10/1994 | Ikkanzaka et al. | 429/250 X |
| 5,609,976 | 3/1997 | Ueda et al. | 429/254 |

FOREIGN PATENT DOCUMENTS 08273650  10/1986  Japan .

*Primary Examiner*—Stephen Kalafut
*Attorney, Agent, or Firm*—Burgess, Ryan & Wayne

[57] ABSTRACT

An alkaline battery separator comprising a hydrophilic nonwoven fabric obtainable from a fiber web prepared by a wet-laid method from (1) dividable composite fibers capable of producing polyolefin fine fibers, (2) high-strength fibers having a single-fiber strength of 5 g/denier or more, and (3) fusible fibers containing at least on a surface thereof a resin component having a melting point lower than a melting point of the dividable composite fibers and lower than a melting point of the high-strength fibers: by dividing the dividable composite fibers, entangling the fibers, and fusing the fusible fibers, to obtain a heat-fused and entangled nonwoven fabric, and imparting a hydrophilic property to the resulting heat-fused and entangled nonwoven fabric; wherein an average fiber length of the constituent fibers of the hydrophilic nonwoven fabric is 10 mm or more, is disclosed. The alkaline battery separator according to the present invention exhibits an excellent electrolyte-holding capacity, tensile strength, tear strength and bending resistance, and can be used to stably prepare a battery. An electrode flash rarely penetrates the separator to thereby cause a short circuit between electrodes.

19 Claims, 2 Drawing Sheets

ALKALINE BATTERY SEPARATOR AND PROCESS FOR PRODUCING THE SAME

BACKGROUND OF THE INVENTION

1. Field of the Invention

The present invention relates to an alkaline battery separator, i.e., a separator for an alkaline battery, and a process for producing the same.

2. Description of the Related Art

In an alkaline battery, a separator is used between a positive electrode and a negative electrode to separate them and to prevent a short circuit therebetween, and further, to hold an electrolyte thereon and enable a smooth electromotive reaction.

Recently, a space allotted for the battery has become smaller in electronic equipment, due to the need for miniaturization and weight-saving. Nevertheless, the performance requirement for such a smaller battery is the same as or higher than that for a conventional battery, and therefore, it is necessary to increase the capacity of the battery, and to increase the amounts of active materials in the electrodes. Thus, a volume allotted in the battery for the separator must be reduced, and a thickness of the separator must be made thinner. However, if a conventional separator is simply thinned, the capacity thereof for holding an electrolyte (i.e., the electrolyte-holding capacity) is lowered, and a dispersibility of fibers is liable to become lower. Therefore, Japanese Unexamined Patent Publication (Kokai) No. 7-29561 and Japanese Unexamined Patent Publication (Kokai) No. 8-138645, for example, disclose that the electrolyte-holding capacity and the dispersibility of fibers can be enhanced by forming a fiber web by a wet-laid method, using dividable composite fibers capable of producing fine fibers having a linear density of 60 μg/m or less. The separators disclosed in these Japanese Publications have an advantageous electrolyte-holding capacity and dispersibility of fibers, but are liable to be broken by the tension generated during a step of assembling electrodes during battery production. Further, an electrode flash and an active material may break and penetrate the separator, to thus cause a short circuit between the electrodes, and therefore, the yield is poor. Further, the separators have low tear-strength and low bending resistance which also lowers the yield.

SUMMARY OF THE INVENTION

Accordingly, the object of the present invention is to remedy the above disadvantages of the prior art, and to provide an alkaline battery separator having an excellent electrolyte-holding capacity, tensile strength, tear strength, and bending resistance, and which is able to be used to produce a battery with the above-described advantageous characteristics, and wherein an electrode flash rarely breaks the separators to thereby cause a short circuit between the electrodes.

Other objects and advantages of the present invention will be apparent from the following description.

In accordance with the present invention, there is provided an alkaline battery separator comprising a hydrophilic nonwoven fabric obtainable from a fiber web prepared by a wet-laid method from (1) dividable composite fibers capable of producing polyolefin fine fibers (hereinafter sometimes referred to as "dividable composite fibers"), (2) high-strength fibers having a single-fiber strength of 5 g/denier or more, and (3) fusible fibers containing at least on a surface thereof a resin component having a melting point lower than a melting point of the dividable composite fiber and lower than a melting point of the high-strength fiber, by dividing the dividable composite fibers, entangling the fibers, and fusing the fusible fibers, to obtain a heat-fused and entangled nonwoven fabric, and imparting a hydrophilic property to the resulting heat-fused and entangled nonwoven fabric; wherein an average fiber length of the constituent fibers of the hydrophilic nonwoven fabric is 10 mm or more.

Further, in accordance with the present invention, there is provided a process for producing an alkaline battery separator comprising the steps of:

substantially uniformly admixing (1) dividable composite fibers capable of producing polyolefin fine fibers, (2) high-strength fibers having a single-fiber strength of 5 g/denier or more, and (3) fusible fibers containing at least on a surface thereof a resin component having a melting point lower than a melting point of the dividable composite fiber and lower than a melting point of the high-strength fiber, by a wet-laid method, to form a fiber web, wherein an average fiber length of the constituent fibers of the fiber web is 10 mm or more; carrying out a dividing of the dividable composite fibers, entangling the fibers, and fusing the fusible fibers, in any sequential order, to obtain a heat-fused and entangled nonwoven fabric; and then, imparting a hydrophilic property to the resulting heat-fused and entangled nonwoven fabric.

DESCRIPTION OF THE PREFERRED EMBODIMENTS

The nonwoven fabric which is a constituent component of the alkaline battery separator of the present invention contains polyolefin fine fibers, and has an excellent electrolyte-holding capacity. The polyolefin fine fibers can be formed from the dividable composite fibers capable of producing polyolefin fine fibers, i.e., dividable composite fibers, by a physical action, such as an action of a water jet, and/or a chemical action, such as removal with a solvent.

The dividable composite fiber which may be used for the alkaline battery separator according to the present invention is composed of two or more resin components (at least one of the resin components is a polyolefin resin component) which are orientated almost in parallel with a lengthwise direction of the dividable composite fiber, in such a manner that the different resin components are brought into contact with each other. The dividable composite fiber may be divided into fine fibers of different resin components by a treatment with a water jet or the like.

Figure 1:
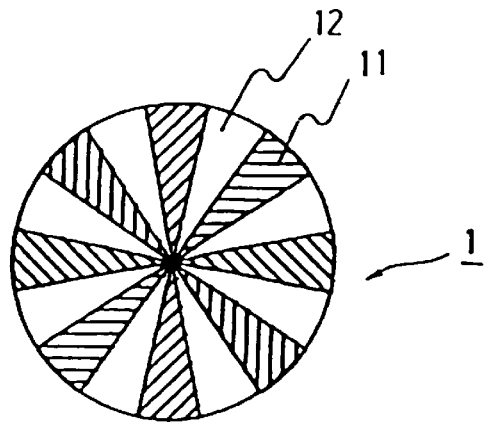
FIG. 1 is a sectional view schematically illustrating a dividable composite fiber which may be used for the alkaline battery separator according to the present invention.
Figure 2:
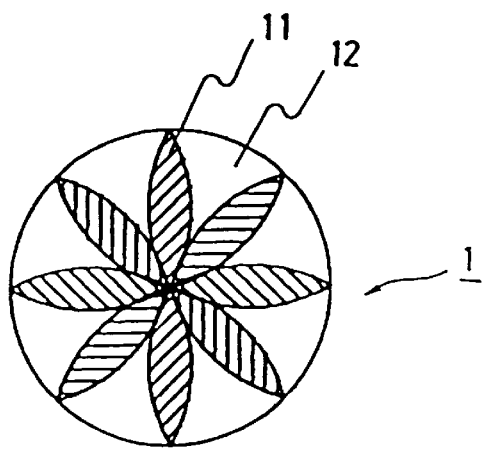
FIG. 2 is a sectional view schematically illustrating another dividable composite fiber which may be used for the alkaline battery separator according to the present invention.
Figure 3:
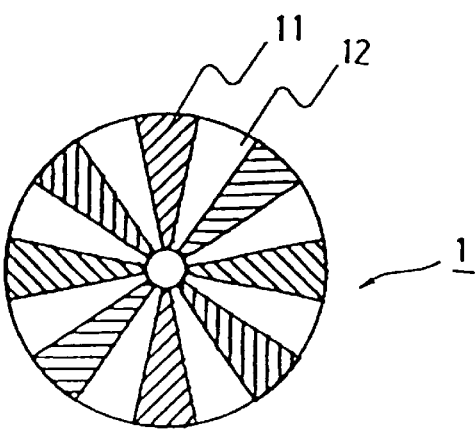
FIG. 3 is a sectional view schematically illustrating still another dividable composite fiber which may be used for the alkaline battery separator according to the present invention.
Figure 4:
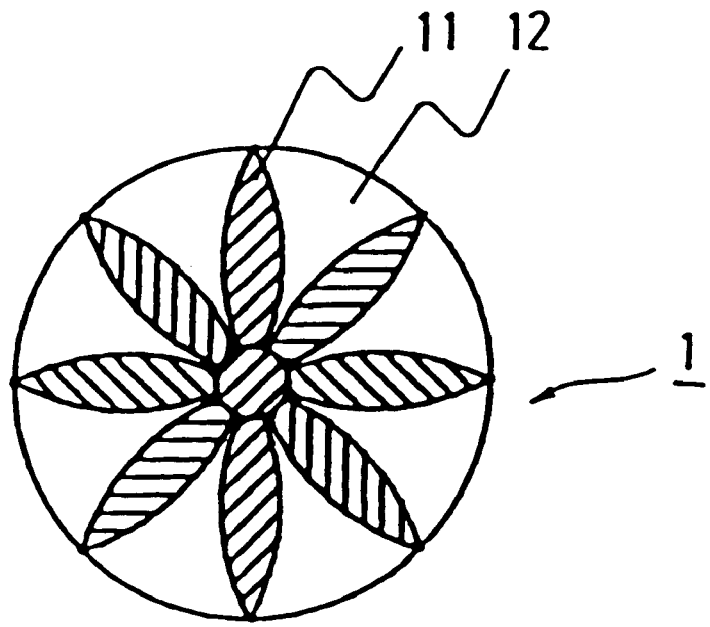
FIG. 4 is a sectional view schematically illustrating still another dividable composite fiber which may be used for the alkaline battery separator according to the present invention.
Figure 5:
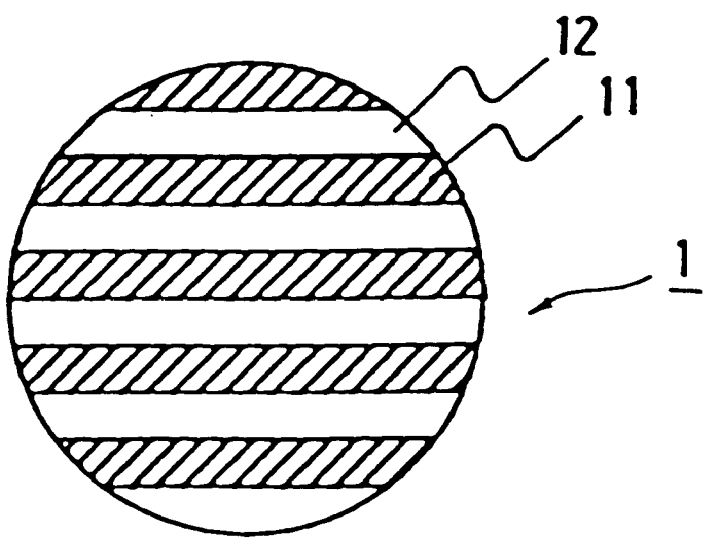
FIG. 5 is a sectional view schematically illustrating still another dividable composite fiber which may be used for the alkaline battery separator according to the present invention.

The arrangement of the resin components in the dividable composite fiber which may be used for the alkaline battery separator of the present invention is not limited. Examples of the arrangement of resin components when the dividable composite fiber is composed of two resin components, will be described with reference to the drawings. FIGS. 1 and 2 illustrate a dividable composite fiber 1 which is composed of a resin component 11 and a different resin component 12 and has a cross-sectional structure wherein the components are divided by straight lines (FIG. 1) or curved lines (FIG. 2) radiating from the center portion; FIGS. 3 and 4 illustrate a dividable composite fiber 1 which is composed of a resin component 11 and a different resin component 12 and has a cross-sectional structure wherein the components are divided by straight lines (FIG. 3) or curved lines (FIG. 4) radiating from the center portion, and one of the resin components 11 and 12 is located in the center portion; and FIG. 5 illustrates a dividable composite fiber 1 having a cross-sectional structure wherein resin components 11 and 12 are laminated. The dividable composite fibers having the cross-sectional structures as shown in FIGS. 1 to 4 are preferable, because of a uniformity in the diameter of the fine fibers derived therefrom.

The dividable composite fiber preferably consists essentially of two or more polyolefin resin components. When a polyolefin dividable composite fiber essentially consisting of two or more polyolefin resin components is used, a resistance to alkalis may be enhanced in a resulting separator.

The polyolefin resin components of the dividable composite fiber may be, for example, polyethylene, polypropylene, polymethylpentene, ethylene-propylene copolymer, ethylene-butene-propylene copolymer, or ethylene-vinyl alcohol copolymer. The polyolefin dividable composite fiber may contain one or more polyolefin resin components together with one or more other resin components, particularly only two or more polyolefin resin components. Of these resin components, polypropylene or polyethylene, which exhibits an excellent resistance to alkalis, is preferable. The combination of the polyolefin resin components is not limited, but the combination of polyethylene and polypropylene is preferable, and the combination of high-density polyethylene and polypropylene is more preferable, because of an excellent resistance thereof to alkalis and acids.

An ethylene-vinyl alcohol copolymer has an excellent electrolyte-holding capacity. When the dividable composite fiber containing an ethylene-vinyl alcohol copolymer as one of the polyolefin resin components is used, the electrolyte-holding capacity in the resulting separator is enhanced. Thus the absorbability of oxygen in an overcharged state, and the performance with respect to an internal pressure of the battery, can be enhanced. It is preferable to combine the ethylene-vinyl alcohol copolymer, which enhances the internal pressure performance, with a polypropylene having an excellent resistance to alkalis.

When a combination of (1) a first dividable composite fiber capable of producing ethylene-vinyl alcohol copolymer fine fibers and one or more other polyolefin fine fibers, i.e., a first polyolefin dividable composite fiber, and (2) a second dividable composite fiber capable of only producing one or more polyolefin fine fibers excepting ethylene-vinyl alcohol copolymer fine fibers, i.e., a second polyolefin dividable composite fiber, is used as the dividable composite fiber in the separator, the resistance to alkalis and the electrolyte-holding capacity thereof can be further enhanced.

The resin component other than polyolefin resin components in the dividable composite fiber is, for example, a polyamide resin component, such as nylon 6, nylon 66 or nylon 12, or a polyvinyl acetate resin component.

When a linear density of the fine fiber becomes lower, the electrolyte-holding capacity in the separator can be further improved, and a needle-like deposition can be more effectively prevented. In this respect, the linear density of the fine fiber is preferably 45 μg/m or less. On the other hand, to ensure a certain degree of fiber strength, the linear density of the fine fiber is preferably 1 μg/m or more. Therefore, the linear density of the fine fiber is more preferably 2.5 to 35 μg/m.

The fine fibers may be produced by dividing the dividable composite fibers by a physical action and/or a chemical action. The physical action includes, for example, a fluid jet, such as a water jet, needle punching, calendering, or flat pressing. Of the above treatments, the fluid jet is a preferable physical action, because a dividing of the dividable composite fibers and an entangling of the fibers as mentioned below can be carried out simultaneously. The chemical action is, for example, a removal or swelling of one or more resin components with a solvent, or the like.

In the present invention, an average fiber length of all the constituent fibers of the hydrophilic nonwoven fabric is 10 mm or more. Thus, the dividing treatment of the dividable composite fibers can be effectively carried out, and a degree of entanglement thereof can be increased. When the average fiber length of the dividable composite fiber (prior to division) is 5 mm or more, the average fiber length of all the constituent fibers of the hydrophilic nonwoven fabric can reach 10 mm or more. However, the average fiber length of the dividable composite fiber is preferably 10 mm or more, more preferably 12 mm or more, most preferably 14 mm or more, to densely entangle the fine fibers produced from the dividable composite fibers. Further, the average fiber length of the dividable composite fiber is preferably 25 mm or less, more preferably 20 mm or less, to form a uniform fiber web by a wet-laid method.

The term "average fiber length" as used herein with regard to the fibers, such as the dividable composite fiber, means a mean value of fiber lengths of 100 fibers, such as 100 dividable composite fibers, randomly sampled from a fiber web or a separator (hydrophilic nonwoven fabric). The fiber length of the dividable composite fiber is not changed after the division, and thus the average fiber length thereof is not changed after the division. The linear density of the dividable composite fiber is not limited, as long as it can produce the fine fibers having the linear density mentioned above.

The content of the dividable composite fibers which may be used for the alkaline battery separator of the present invention is not limited. The dividable composite fibers may account for preferably 35 to 50 mass %, more preferably 35 to 45 mass %, with respect to a total mass of the dividable composite fibers, the fusible fibers and the high-strength fibers. If the content is less than 35 mass %, a sufficient electrolyte-holding capacity cannot be always obtained. If the content is more than 50 mass %, the ratios of other fibers drop, and thus the tensile and the breaking strengths may be lowered. When a combination of (1) the first polyolefin dividable composite fiber capable of producing ethylene-vinyl alcohol copolymer fine fibers and one or more other polyolefin fine fibers, and (2) the second polyolefin dividable composite fiber capable of only producing one or more polyolefin fine fibers excepting ethylene-vinyl alcohol copolymer fine fibers is used as the dividable composite fiber, the first polyolefin dividable composite fiber may account for preferably 5 to 40 mass %, more preferably 5 to 35 mass %, most preferably 10 to 30 mass %, and the second polyolefin dividable composite fiber may account for preferably 10 to 45 mass %, more preferably 10 to 40 mass %, most preferably 15 to 35 mass %, with respect to a total mass of the dividable composite fibers, the fusible fibers and the high-strength fibers, respectively.

The nonwoven fabric composed of the alkaline battery separator of the present invention contains the high-strength fibers having a single-fiber strength (tensile strength) of 5 g/denier or more. Therefore, the intrusion of electrode flashes to the separator can be prevented and a short circuit between the electrodes prevented, when the battery is assembled using the separator. If the single-fiber strength is less than 5 g/denier, a short circuit cannot be sufficiently prevented. Therefore, it is preferable to use the high-strength fiber having a single-fiber strength of 7 g/denier or more, more preferably 9 g/denier. The single-fiber strength is measured in accordance with JIS (Japanese Industrial Standard) L1015, a testing method for chemical staple fibers.

The high-strength fiber is not limited, as long as it has a single-fiber strength of 5 g/denier or more. As the high-strength fiber, general-purpose synthetic fibers, such as polypropylene, polyethylene, or polyamide, may be used. It is preferable to use, as the high-strength fiber, a synthetic fiber containing, at least on the surface, one or more polyolefin resin components which are the same as those composed of the polyolefin fine fibers. Polypropylene or polyethylene may be preferably used as the resin component present on the surface, because of a long-term resistance thereof to alkalis and acids.

The linear density of the high-strength fiber is preferably 40 to 650 μg/m, to ensure that there is no reduction of the electrolyte-holding capacity.

When the average fiber length of the high-strength fiber is 5 mm or more, the average fiber length of all the constituent fibers of the hydrophilic nonwoven fabric can reach 10 mm or more. However, the average fiber length of the high-strength fiber is preferably 10 mm or more, to densely entangle the high-strength fibers. Further, the average fiber length of the high-strength fiber is preferably 25 mm or less, more preferably 20 mm or less, to ensure the forming of a uniform fiber web by a wet-laid method.

It is preferable to use an ultra-high-strength polyethylene fiber having a single-fiber strength of 25 g/denier or more, more preferably 30 g/denier or more, as the high-strength fiber, because such an ultra-high-strength polyethylene fiber also has an excellent elasticity, and therefore, breakage of the separator caused by a tension applied during the assembly of the battery, a short circuit between electrodes via an electrode flash which penetrates through the separator from one electrode to another electrode, or tearing by an electrode edge are avoided.

A content of the high-strength fiber in the alkaline battery separator of the present invention is not limited, but the high-strength fiber is used in an amount of preferably 30 to 45 mass %, more preferably 30 to 40 mass %, most preferably 35 to 40 mass %, with respect to the total mass of the dividable composite fibers, the high-strength fibers and the fusible fibers. The battery performances (such as lifetime, internal pressure, or the like) of the alkaline battery separator of the present invention vary mainly in accordance to the entangled condition of fine fibers derived from the dividable composite fibers and the fused condition of the fusible fibers. If the amount of the high-strength fibers is more than 45 mass %, a required battery performance cannot be always obtained. If the amount of the high-strength fibers is less than 30 mass %, a short circuit cannot be sufficiently prevented.

The amount of the ultra-high-strength polyethylene fiber having a single-fiber strength of 25 g/denier or more, more preferably 30 g/denier or more, which is used as the high-strength fiber, is preferably 1 to 45 mass %, more preferably 5 to 40 mass %, with respect to the total mass of the dividable composite fibers, the high-strength fibers and the fusible fibers. When the amount of the ultra-high-strength polyethylene fiber is less than 30 mass %, other high-strength fibers may be preferably added to adjust the total amount of the high-strength fibers to 30 to 45 mass % with respect to the total mass of the dividable composite fibers, the high-strength fibers and the fusible fibers.

The nonwoven fabric composed of the alkaline battery separator of the present invention contains the fusible fibers, and thus the tensile strength and the bending resistance of the separator are enhanced. As the fusible fibers, those containing at least on a surface thereof a resin component having a melting point lower than melting points of the dividable composite fiber and the high-strength fiber are used, to avoid any reduction of the electrolyte-holding capacity due to the fine fibers produced from the dividable composite fibers, and of the strength due to the high-strength fibers. The component is sometimes referred to hereinafter as a low-melting-point component. The melting point of the low-melting-point component composed of the fusible fiber is lower than a melting point of the dividable composite fiber and a melting point of the high-strength fiber, by preferably 10° C. or more, more preferably 15° C. or more.

It is preferable to use the fusible fibers containing one or more resin components which are the same as those in the polyolefin fine fibers, for example, polyethylene, polypropylene, polymethylpentene, ethylene-propylene copolymer, or ethylene-butene-propylene copolymer, because of an excellent resistance to alkalis thereof. When the dividable composite fiber containing polyethylene and polypropylene is used, the polyethylene in the dividable composite fiber is preferably high-density polyethylene, and the low-melting-point component of the fusible fiber is preferably low-density polyethylene. The fusible fiber may be composed of a single component or two or more components. However, the fusible fiber composed of two or more components is preferable, because the tensile strength of the separator can be thus enhanced. The fusible fiber may be a wholly fusible fiber which consists essentially of a polyolefin fusible component, or a partially fusible fiber which contains two or more resin components and carries a polyolefin fusible component on a fiber surface. A wholly fusible fiber consisting essentially of a single component is, for example, polyethylene, or polypropylene fiber. As a partially fusible fiber composed of two or more resin components, there may be mentioned, for example, a sheath-core type, side-by-side type, sea-islands type, orange-like cross-sectional type, multiple bimetal type or eccentric type composite fiber.

When the average fiber length of the fusible fiber is 5 mm or more, the average fiber length of all the constituent fibers of the hydrophilic nonwoven fabric can reach 10 mm or more. However, the average fiber length of the fusible fiber is preferably 10 mm or more, to ensure the fusion of the fusible fibers in a densely entangled state. Further, the average fiber length of the fusible fiber is preferably 25 mm or less, more preferably 20 mm or less to enable the forming of a uniform fiber web by a wet-laid method. The linear density of the fusible fiber is preferably 100 to 450 μg/m, to prevent a reduction of the electrolyte-holding capacity.

The content of the fusible fibers in the alkaline battery separator of the present invention is not limited. The fusible fibers may account for preferably 20 to 35 mass %, more preferably 20 to 30 mass % with respect to a total mass of the dividable composite fibers, the high-strength fibers and the fusible fibers. If the content is less than 20 mass %, the tensile strength or bending resistance may be lowered. If the content is more than 35 mass %, the ratios of the other fibers drop, and thus the electrolyte-holding capacity under pressure or the breaking strength may be lowered.

In the alkaline battery separator of the present invention, the contents of the dividable composite fibers, the fusible fibers and the high-strength fibers in combination thereof are not limited. However, with respect to a total mass of the dividable composite fibers, the fusible fibers and the high-strength fibers, a combination of 35 to 50 mass % of the dividable composite fibers, 30 to 45 mass % of the high-strength fibers and 20 to 35 mass % of the fusible fibers is preferable, a combination of 35 to 45 mass % of the dividable composite fibers, 30 to 40 mass % of the high-strength fibers and 20 to 30 mass % of the fusible fibers is more preferable, and a combination of 35 to 45 mass % of the dividable composite fibers, 35 to 40 mass % of the high-strength fibers and 20 to 30 mass % of the fusible fibers is most preferable.

In addition to the polyolefin fine fibers, the high-strength fibers and the fusible fibers as above, the separator of the present invention may further contain dividable composite fibers which may be undivided. If necessary, the separator of the present invention may further contain a fourth fiber in addition to the above fibers. The fourth fiber preferably contains one or more polyolefin resin components which are the same as those of the fine fibers, because of an excellent resistance to alkalis thereof. The average fiber length of the fourth fiber is preferably 10 to 25 mm, more preferably 15 to 20 mm, to obtain a dense entanglement and form a uniform fiber web by a wet-laid method. The fourth fibers may account for preferably 15 mass % or less, more preferably 10 mass % or less, taking into account the ratio of the dividable composite fibers, the high-strength fibers and the fusible fibers.

The alkaline battery of the present invention is composed of a hydrophilic nonwoven fabric which may be produced, for example, by the following process.

The dividable composite fibers, the high-strength fibers and the fusible fibers are substantially uniformly mixed to form a fiber web by a wet-laid method; the resulting fiber web is subjected to a dividing treatment of the dividable composite fibers, an entangling treatment of the fibers, and a fusing treatment of the fusible fibers, in any sequential order, to obtain a heat-fused and entangled nonwoven fabric; and a hydrophilic property is imparted to the resulting heat-fused and entangled nonwoven fabric to obtain the hydrophilic nonwoven fabric which may be used as the separator.

The wet-laid method which may be used is a conventionally known method, such as a horizontal wire type, a tilted wire type, a cylinder type, or a wire-cylinder combination type. The fiber web wherein all the constituent fibers are substantially uniformly mixed may be prepared by the wet-laid method.

Thereafter, the resulting fiber web is subjected to a dividing treatment of the dividable composite fibers, an entangling treatment of the fibers, and a fusing treatment of the fusible fibers, to form a heat-fused and entangled nonwoven fabric. The dividing, entangling and fusing treatments may be carried out in any sequential order, and each of the treatments may be carried out one or more times. For example, the fiber web may be subjected to the dividing treatment first, then the entangling treatment, and finally the fusing treatment. Alternatively, the fusing treatment may be carried out first, then the dividing treatment, and subsequently, the entangling treatment may be carried out. Further, it is possible to carry out the fusing treatment first, then the dividing treatment, subsequently the entangling treatment, and further, the fusing treatment.

In the present invention, the fiber web is prepared from relatively short fibers by the wet-laid method, and individual fibers in the fiber web have a high degree of freedom. Thus, the fiber web is relatively difficult to divide the dividable composite fibers or entangle the fibers. Therefore, the fusing treatment is preferably carried out first, to lower the degree of freedom of the fibers, and then the dividing and entangling treatments are carried out. The dividing and entangling treatments may be carried out separately, but preferably are carried out simultaneously as in the treatment with a fluid jet as mentioned below.

As the dividing treatment which may be used in the present invention, there may be mentioned, for example, a treatment with a fluid jet, such as a water jet, needle punching, calendering, or flat pressing. Of the above treatments, the treatment with the fluid jet is preferable, because the dividing of the dividable composite fibers and the entangling of the fibers can be carried out simultaneously.

As the entangling treatment which may be used in the present invention, there may be mentioned, for example, needle punching, or a treatment with a fluid jet, such as a water jet. The entangling treatment with the fluid jet is preferable, because the whole fiber web can be uniformly entangled.

The fluid-entangling (particularly hydro-entangling) conditions are not particularly limited, but may be carried out under conventional conditions. For example, a nozzle plate containing one or more lines of nozzles having a diameter of 0.05 to 0.3 mm and a pitch of 0.2 to 3 mm may be used with a fluid jet (particularly water jet) under a pressure of 1 to 29 MPa. The fluid-entangling (particularly hydro-entangling) treatment may be carried out once, twice or more times, if necessary, to one side or to both sides of the fiber web. If the fiber web is fluid-entangled (particularly hydro-entangled) on a support, such as a net or a perforated panel containing large pores, the resulting entangled nonwoven fabric also has large pores. The alkaline battery made from such an entangled nonwoven fabric is liable to cause a short circuit. Therefore, it is preferable to use a square-weave or plain weave fabric net having fine pores (for example, 50 mesh or more), or a perforated panel having a pore-to-pore distance of 0.4 mm or less.

The fusing treatment can be carried out by heating the fiber web or the entangled nonwoven fabric at a temperature which is higher than a softening point of the low-melting-point component in the fusible fibers, but lower than a melting point of each constitutional resin component of the dividable composite fiber, and lower than a melting point of the high-strength fiber. The fusing treatment can be carried out once, or more times if necessary. When the fusing treatment is carried out twice or more times, each treatment may be conducted under the same conditions, or partially or wholly different conditions. When the fusing treatment is carried out twice or more times, a first fusing step corresponds to, or two or more steps (including a first fusing step but excluding a final fusing step) correspond to the pre-fusing treatment. When the high-strength fiber used contains the ultra-high-strength polyethylene fiber, the fusing is preferably carried out at a temperature below a softening point of the ultra-high-strength polyethylene fiber, for example, below 125° C. to ensure that there is no weakening of the strength of the ultra-high-strength polyethylene fiber.

The sequence of the heat-fusing treatment and the fluid-entangling treatment is not specified. The heat-fused and entangled nonwoven fabric can be obtained by carrying out one treatment, and subsequently the other treatment, or one treatment and then the other treatment, and thereafter, the first treatment under the same conditions or partially or under wholly different conditions. For example, it is possible to carry out the first pre-fusing treatment, then the fluid-entangling treatment, and thereafter the heat-fusing treatment.

In the present invention, the fusing treatment can be carried out under pressure or without pressure, or first without pressure to fuse the low-melting-point component of the fusible fibers and then under pressure. It is preferable to fuse the low-melting-point component of the fusible fibers under pressure, or first without pressure to fuse the low-melting-point component of the fusible fibers and then under pressure, because the thickness can be thus controlled. A fusing apparatus which may be used is, for example, a heating-calender, a hot-air through-type heater, a cylinder contact heater or the like. When heat is applied under pressure, the heating temperature preferably ranges from a softening temperature to a melting point of the low-melting-point component in the fusible fibers. When a heat is applied, and thereafter pressure is applied, the heating temperature preferably ranges from a softening temperature of the low-melting-point component in the fusible fibers to a temperature which is 20° C. higher than the melting point of the low-melting-point component in the fusible fibers. In each case, the pressure applied is preferably a linear pressure of 5 to 30 N/cm.

The resulting heat-fused and entangled nonwoven fabric has an excellent tensile strength, tear strength, and bending resistance, and can effectively avoid short circuiting.

In the present invention, the heat-fused and entangled nonwoven fabric is mainly composed of polyolefin fibers, to thereby enhance a resistance to alkalis, and therefore, an electrolyte-holding capacity can be enhanced by imparting a hydrophilic property to the heat-fused and entangled nonwoven fabric. The treatment used for imparting a hydrophilic property may be, for example, a sulfonating treatment, a treatment with fluorine gas, a graft polymerization treatment with vinyl monomers, a treatment with a surface-active agent, a treatment to adhere hydrophilic resins, a discharging treatment, or the like.

The sulfonating treatment contains, for example, but is not limited to, a treatment with fuming sulfuric acid, sulfuric acid, sulfur trioxide, chlorosulfuric acid, sulfuryl chloride, or the like. Of these treatments, the sulfonating treatment with fuming sulfuric acid is preferable, because a high reactivity and easier sulfonation is obtained. The sulfonated separator has an advantage in that any self-discharging can be inhibited.

The treatment with fluorine gas contains, for example, but is not limited to, a treatment with a gas mixture of fluorine gas diluted with an inactive gas (such as nitrogen or argon gas) and at least one gas selected from a group consisting of oxygen, carbon dioxide and sulfur dioxide gases. The hydrophilic property can be effectively and permanently imparted by absorbing sulfur dioxide gas to the heat-fused and entangled nonwoven fabric, and then bringing the heat-fused and entangled nonwoven fabric into contact with fluorine gas.

Examples of the vinyl monomer which may be used in the graft polymerization treatment are acrylic acid, methacrylic acid, acrylate, methacrylate, vinyl pyridine, vinyl pyrrolidone, styrene, or the like. When styrene is grafted, it is preferable to further carry out the sulfonation treatment, to thereby impart an affinity with the electrolyte. Acrylic acid has a good affinity with an electrolyte and may be preferably used.

The vinyl monomers can be polymerized, for example, by dipping the heat-fused and entangled nonwoven fabric in a solution containing the vinyl monomers and an initiator, and heating; by coating vinyl monomers on the heat-fused and entangled nonwoven fabric and applying radiation; by applying radiation to the heat-fused and entangled nonwoven fabric and then bringing the heat-fused and entangled nonwoven fabric into contact with the vinyl monomers; by impregnating the heat-fused and entangled nonwoven fabric with a solution containing vinyl monomers and a sensitizing agent, and applying ultraviolet rays. The graft polymerization can be effectively carried out by treating the surface of the heat-fused and entangled nonwoven fabric with ultraviolet radiation, a corona discharge or a plasma discharge before bringing the heat-fused and entangled nonwoven fabric into contact with the vinyl monomer solution, to enhance the affinity thereof with the vinyl monomer solution and easily generate radicals through polar hydrophilic groups produced in the pre-treatment.

The treatment with a surface-active agent may be carried out by applying, for example, spraying or coating, a solution of an anionic surface-active agent (such as an alkali metal salt of a higher fatty acid, alkyl sulfonate, or a salt of sulfosuccinate) or a nonionic surface-active agent (such as polyoxyethylene alkyl ether, or polyoxyethylene alkylphenol ether) to the heat-fused and entangled nonwoven fabric, or dipping the heat-fused and entangled nonwoven fabric in the solution.

The treatment to adhere hydrophilic resins can be carried out by adhering hydrophilic resins such as carboxymethyl cellulose, polyvinyl alcohol, or polyacrylic acid, to the heat-fused and entangled nonwoven fabric. The hydrophilic resins may be adhered to the heat-fused and entangled nonwoven fabric, by spraying or coating a solution or dispersion of the hydrophilic resins in an appropriate solvent or dispersant, or dipping the heat-fused and entangled nonwoven fabric in the solution or dispersion, and then drying.

Further, the treatment to adhere hydrophilic resins can be conducted by adhering cross-linked polyvinyl alcohols to the heat-fused and entangled nonwoven fabric. The cross-linked polyvinyl alcohol can be formed, for example, by cross-linking a photosensitive polyvinyl alcohol substituted by a photosensitive group at a part of hydroxy groups, or an acylated derivative thereof prepared by acylating a part of hydroxy groups of the photosensitive polyvinyl alcohol.

The cross-linked polyvinyl alcohols can be adhered to the heat-fused and entangled nonwoven fabric, for example, by dissolving or dispersing the cross-linking photosensitive polyvinyl alcohols or the cross-linking photosensitive acylated polyvinyl alcohols, dipping the heat-fused and entangled nonwoven fabric in the resulting solution or dispersion, or spraying or coating the resulting solution or dispersion on the heat-fused and entangled nonwoven fabric, drying the solution or dispersion on the heat-fused and entangled nonwoven fabric, and radiating with light to cause a cross-linking reaction.

Of known hydrophilic resins, cross-linked polyvinyl alcohols formed by cross-linking the photosensitive polyvinyl alcohols or photosensitive acylated polyvinyl alcohols having a photosensitive group, such as styryl pyridinium, styryl quinolinium or a styryl benzthiazolinium compound may be preferably used. This is not only because they have an excellent resistance to alkalis, but also because they contain many functional groups, i.e., hydroxyl groups, which can form a chelate with an ion, and thus the functional groups can form chelates with ions before the ions are deposited on electrodes in the form of branches, during charging and/or discharging, to thereby effectively prevent a short circuit between the electrodes. The amount of hydrophilic resins adhered is preferably 0.3 to 3 mass % with respect to the mass of the separator, to ensure that there is no affect on the air-permeability.

As the discharging treatment, there may be mentioned, for example, treatments with a corona discharge, plasma, glow discharge, surface discharge, or electron rays. Of the discharging treatments, the plasma treatment comprising the steps of placing the heat-fused and entangled nonwoven fabric between a pair of electrodes carrying a dielectric layer on a surface facing the other electrode under an atmospheric condition, i.e., in air under an atmospheric pressure, so that the outer surfaces of the heat-fused and entangled nonwoven fabric are brought into contact with both dielectric layers without coming into contact with the electrodes, and then applying an alternating current voltage between the electrodes to thereby induce an electric discharge in internal voids contained in the heat-fused and entangled nonwoven fabric sandwiched between the electrodes, can be preferably conducted. This is because not only the outer surfaces, but also the insides of the heat-fused and entangled nonwoven fabric can be effectively treated; the heat-fused and entangled nonwoven fabric to be treated is difficult to be damaged by a spark discharge or the like; and any kind of gases can be used for treating surfaces.

The density per unit area of the resulting alkaline battery separator of the present invention is preferably 30 to 100 g/m$^2$, more preferably, 40 to 80 g/m$^2$. If the density per unit area is less than 30 g/m$^2$, a sufficient tensile strength may not be obtained. If the density per unit area is more than 100 g/m$^2$, the separator becomes too thick and thus the ratio of the separator in a battery becomes too high to obtain a battery with a high capacity.

The lengthwise (longitudinal) tensile strength of the alkaline battery separator of the present invention is preferably 80 N/50 mm or more, more preferably 100 N/50 mm or more, to avoid any breakage of the separator by the tension generated during a step of assembling electrodes during battery production. The tensile strength is measured by setting a sample (width=50 mm) on a tensile tester (TENSILON UTM-III-100; manufactured by ORIENTEC, Co.), at a chuck-to-chuck distance of 100 mm and a pulling rate of 300 mm/min.

The lengthwise tear strength of the alkaline battery separator of the present invention is preferably 10 N/50 mm or more, more preferably 20 N/50 mm or more, most preferably 25 N/50 mm or more, to avoid a tearing of the separator by an edge of an electrode during a step of assembling electrodes during battery production. The tear strength is measured in accordance with JIS L 1096$^{-1990}$ (a method for testing general textiles; trapezoidal tearing strength test).

The lengthwise bending resistance of the alkaline battery separator of the present invention is preferably 10 mg or more, more preferably 15 mg or more, to maintain the shape of the separator and avoid any winding-deviation during the step of assembling electrodes during battery production. The bending resistance is measured in accordance with JIS L 1096 [bending resistance; the A method].

The alkaline battery separator of the present invention has an excellent electrolyte-holding capacity, tensile strength, tear strength, and bending resistance, and can effectively avoid short circuiting. Therefore, a battery can be stably assembled using this separator. The alkaline battery separator of the present invention can be used in an alkaline primary battery, such as an alkaline-manganese battery, a mercury battery, a silver oxide battery, an air battery, or the like, or an alkaline secondary battery, such as a nickel-cadmium battery, silver-zinc battery, silver-cadmium battery, nickel-zinc battery, nickel-hydrogen battery or the like.

EXAMPLES

The present invention will now be further illustrated by, but is by no means limited to, the following Examples.

EXAMPLE 1

A fiber web was formed by a conventional wet-laid method from a slurry prepared by mixing and dispersing (1) 40 mass % of dividable composite fibers (linear density=144 μg/m; fiber length=15 mm) having a cross-sectional structure, as shown in FIG. 3, wherein polypropylene components (components 12 in FIG. 3) capable of producing fine fibers (linear density=8.9 μg/m; melting point=160° C.) and high-density polyethylene components (components 11 in FIG. 3) capable of producing fine fibers (linear density=8.9 μg/m; melting point=130° C.) radiated from the center portion, and divided into 8 portions, respectively, and a circular polypropylene component capable of producing a fine fiber (linear density=2.2 μg/m; melting point=160° C.) was located in the center portion, (2) 35 mass % of high-strength polypropylene fibers (linear density=222 μg/m; fiber length=10 mm; melting point=160° C.) having a single-fiber strength of 9 g/denier, and (3) 25 mass % of sheath-core (concentric) fusible fibers (linear density=222 μg/m; fiber length=10 mm) composed of a core component of polypropylene and a sheath component of low-density polyethylene (melting point=110° C.).

Then, the resulting fiber web was heated at 125° C. to pre-fuse only the low-density polyethylene component of the fusible fibers. The pre-fused nonwoven fabric was mounted on a net (linear diameter=0.15 mm), and then the dividable fibers were divided and the fibers were entangled with a water jet having a hydraulic pressure of 12.7 MPa, using a nozzle plate having a nozzle diameter of 0.13 mm and a pitch of 0.6 mm, wherein each side of the pre-fused nonwoven fabric was alternately treated twice. Thereafter, the entangled nonwoven fabric was heated at 125° C., to fuse only the low-density polyethylene component of the fusible fibers and thereby obtain a fused and entangled nonwoven fabric. The resulting fused and entangled nonwoven fabric was calendered under a linear pressure of 9.8 N/cm, and then treated with fluorine gas, using a gas mixture of fluorine, oxygen and sulfur dioxide gases, to obtain an alkaline battery separator (area density=55 g/m$^2$; thickness=0.15 mm) of the present invention.

EXAMPLE 2

The procedure disclosed in Example 1 was repeated, using 40 mass % of dividable composite fibers having structures the same as those of the dividable composite fibers used in Example 1, except that a fiber length was 10 mm, to obtain an alkaline battery separator (area density=55 g/m$^2$; thickness=0.15 mm) of the present invention.

EXAMPLE 3

The procedure disclosed in Example 1 was repeated, except that a mass ratio of the dividable composite fibers, high-strength fibers and fusible fibers was 50:30:20, to obtain an alkaline battery separator (area density=55 g/m$^2$; thickness=0.15 mm) of the present invention.

EXAMPLE 4

The procedure disclosed in Example 1 was repeated, except that a combination of (1) 20 mass % of first dividable composite fibers (linear density=333 µg/m; fiber length=6 mm) having an orange-like cross-sectional structure, as shown in FIG. 1, and composed of polypropylene components (components 12 in FIG. 1) capable of producing eight fan-shaped polypropylene fine fibers (linear density=20.8 µg/m; melting point=160° C.) and ethylene-vinyl alcohol copolymer components (components 11 in FIG. 1) capable of producing eight fan-shaped ethylene-vinyl alcohol copolymer fine fibers (linear density=20.8 µg/m), and (2) 20 mass % of second dividable composite fibers same as those used in Example 1 was used instead of 40 mass % of the dividable composite fibers, to obtain an alkaline battery separator (area density=50 g/m$^2$; thickness=0.12 mm) of the present invention.

EXAMPLE 5

The procedure disclosed in Example 1 was repeated, except that (A) a combination of (1) 5 mass % of ultra-high-strength polyethylene fibers having a single-fiber strength of 33 g/d, a linear density of 111 µg/m and a fiber length of 10 mm, and (2) 30 mass % of the high-strength fibers same as those used in Example 1 was used instead of the high-strength fibers, (B) the heat treatment prior to the hydro-entanglement was conducted at 115° C., and (C) the heat treatment after the hydro-entanglement was conducted at 115° C., to obtain an alkaline battery separator (area density=50 g/m$^2$; thickness=0.12 mm) of the present invention.

EXAMPLE 6

The procedure disclosed in Example 1 was repeated, except that 10 mass % of the ultra-high-strength polyethylene fibers used in Example 5, 40 mass % of the dividable composite fibers used in Example 1, 25 mass % of the polypropylene fibers (single-fiber strength=9 g/d) used in Example 1, and 25 mass % of the fusible fibers used in Example 1 were used, to obtain a fiber web. The resulting fiber web was then treated as in Example 5, i.e., heated, divided and entangled with water jet, heated, calendered, and treated with fluorine gas, to obtain an alkaline battery separator (area density=50 g/m$^2$; thickness=0.12 mm) of the present invention.

EXAMPLE 7

The procedure disclosed in Example 1 was repeated, except that 35 mass % of the ultra-high-strength polyethylene fibers used in Example 5, 40 mass % of the dividable composite fibers used in Example 1, and 25 mass % of the fusible fibers used in Example 1 were used, to obtain a fiber web. The resulting fiber web was then treated as in Example 5, i.e., heated, divided and entangled with water jet, heated, calendered, and treated with fluorine gas, to obtain an alkaline battery separator (area density=50 g/m$^2$; thickness=0.12 mm) of the present invention.

EXAMPLE 8

The procedure disclosed in Example 1 was repeated, except that 10 mass % of the ultra-high-strength polyethylene fibers used in Example 5, 20 mass % of the dividable composite fibers used in Example 1, 25 mass % of the polypropylene fibers (single-fiber strength=9 g/d) used in Example 1, 25 mass % of the fusible fibers used in Example 1 and 20 mass % of the first dividable composite fibers used in Example 4 were used, to obtain a fiber web. The resulting fiber web was then treated as in Example 5, i.e., heated, divided and entangled with water jet, heated, calendered, and treated with fluorine gas, to obtain an alkaline battery separator (area density=50 g/m$^2$; thickness=0.12 mm) of the present invention.

COMPARATIVE EXAMPLE 1

The procedure disclosed in Example 1 was repeated, using 40 mass % of dividable composite fibers having structures the same as those of the dividable composite fibers used in Example 1 except that a fiber length was 5 mm, to obtain a separator (area density=55 g/m$^2$; thickness=0.15 mm) for comparison.

COMPARATIVE EXAMPLE 2

The procedure disclosed in Example 1 was repeated, except that 35 mass % of polypropylene fibers (single-fiber strength=4 g/denier; linear density=222 µg/m; fiber length=10 mm; melting point=160° C.) was used instead of the high-strength fibers, to obtain a separator (area density=55 g/m$^2$; thickness=0.15 mm) for comparison.

COMPARATIVE EXAMPLE 3

A fiber web was formed by a conventional wet-laid method from a slurry prepared by mixing and dispersing 40 mass % of the dividable composite fibers used in Example 1, 25 mass % of the fusible fibers used in Example 1, and 35 mass % of polypropylene fibers (single-fiber strength=4 g/denier; linear density=222 µg/m; fiber length=10 mm; melting point=160° C.). The resulting fiber web was then treated as in Example 1, i.e., heated, divided and entangled with water jet, heated, calendered, and treated with fluorine gas, to obtain a separator (area density=50 g/m$^2$; thickness=0.12 mm) for comparison.

Evaluation of Properties (1) Lengthwise tensile strength

Each of the separators prepared in Examples 1 to 8 and Comparative Examples 1 to 3 was set on a tensile tester (TENSILON UCT-500; manufactured by ORIENTEC, Co.), and a lengthwise tensile strength was measured at a chuck-to-chuck distance of 100 mm and a pulling rate of 300 mm/min (width of each separator=50 mm). The results are shown in Table 1.

(2) Index of resistance to penetration

An index of resistance to penetration was measured by a handy-type compression tester (KES-G5; manufactured by KATO TECH Co., Ltd.). A laminate having a thickness of about 2 mm was formed from each of the alkaline battery separators prepared in Examples 1 to 8 and Comparative Examples 1 to 3. A stainless steel jig (thickness=0.5 mm; angle of the blade edge=60°) connected with the handy-type compression tester was thrust perpendicularly into the laminate from the top layer at a rate of 0.01 cm/s, and the force required to cut the top layer was measured. For the separators prepared in Examples 1 to 3 and Comparative Example 1, the ratio of the force required to cut the top layer of each separator to the standard force (100) required to cut the top layer of the separator prepared in Comparative Example 2 was recorded as the index (%) of resistance to penetration. For the separators prepared in Examples 4 to 8, the ratio of the force required to cut the top layer of each separator to the standard force (100) required to cut the top layer of the separator prepared in Comparative Example 3 was recorded as the index (%) of resistance to penetration. The results are shown in Table 1.

(3) Lengthwise tear strength

The lengthwise tear strength of each of the separators prepared in Examples 1 to 8 and Comparative Examples 1 to 3 was measured in accordance with JIS L 1096$^{-1990}$ (a method for testing general textiles; trapezoidal tearing strength test). The results are shown in Table 1.

(4) Lengthwise bending resistance

The lengthwise bending resistance of each of the separators prepared in Examples 1 to 8 and Comparative Examples 1 to 3 was measured in accordance with JIS L 1096 [bending resistance; the A method]. The results are shown in Table 1.

(5) Capacity for holding an electrolyte under pressure

Each of the alkaline battery separators prepared in Examples 1 to 8 and Comparative Examples 1 to 3 was cut to form a disc having a diameter of 30 mm. The disc was placed at 20° C. under a relative humidity of 65% so that the moisture content was equilibrated. Thereafter, the mass ($M_0$) was measured. Then, the disc was dipped in an aqueous potassium hydroxide solution having a specific gravity of 1.3 (at 20° C.) for 1 hour, to replace air in the disc with the potassium hydroxide solution. The disc holding the potassium hydroxide solution was sandwiched between six filter papers having a diameter of 30 mm (three papers on each side) and a pressure of 5.7 MPa was applied for 30 seconds by a pressure pump. Then the mass ($M_1$) of the pressed disc was measured. The capacity (X; %) for holding an electrolyte under pressure was calculated from the equation:

$$X=[(M_1-M_0)/M_0]\times 100$$

The average values obtained from four measurements for each alkaline battery separator are shown in Table 1.

(6) Test of cycle lifetime

The cycle lifetime was evaluated only for alkaline battery separators prepared in Example 4 and Comparative Example 3.

As a current collector of electrodes, a paste nickel positive electrode (width=33 mm; length=182 mm) prepared from a foamed nickel base, and a paste hydrogen-occluded alloy negative electrode (mesh metal alloy; width=33 mm; length=247 mm) were formed. Each of the alkaline battery separators prepared in Example 5 and Comparative Example 3 was cut into a separator sample (width=33 mm; length=410 mm). The separator sample was sandwiched between the positive and negative electrodes and rolled into a voluted form to obtain SC (sub-C) type electrodes. The electrodes were put into an outer container, 5 N potassium hydroxide and 1 N lithium hydroxide were poured in as electrolytes, and the container was sealed to obtain a cylindrical nickel-hydrogen battery.

For each of the cylindrical nickel-hydrogen batteries, a charging-discharging cycle consisting of charging at 0.2 C (coulomb) to 150 %, and discharging at 1 C (coulomb) to a final voltage of 1.0 V was repeated. A charging-discharging lifetime was measured by judging that the charging-discharging lifetime was exhausted when the discharging capacity was lowered to 50% of the initial capacity. When the cycle number for the separator of Example 4 was regarded as a standard (100), the cycle number for the separator of Comparative Example 3 was 100.

(7) Test for internal pressure

The internal pressure was also evaluated only for alkaline battery separators prepared in Example 4 and Comparative Example 3. As in the "Test of cycle lifetime", the cylindrical nickel-hydrogen batteries were prepared, then the battery was discharged at 0.5 C (coulomb) and 20° C., and the internal pressure of the battery at a capacity of 150% was measured. In comparison with the internal pressure (100) of the battery prepared from the separator of Comparative Example 3, the internal pressure of the battery prepared from the separator of Example 4 was 70.

TABLE 1

|  | A (N/50 mm) | B (%) | C (N/50 mm) | D (mg) | E (%) |
|---|---|---|---|---|---|
| Example 1 | 163 | 153 | 29.4 | 25.2 | 15.0 |
| Example 2 | 132 | 150 | 27.4 | 22.9 | 15.0 |
| Example 3 | 152 | 144 | 31.4 | 22.4 | 17.5 |
| Example 4 | 110 | 159 | 44 | 17.5 | 18 |
| Example 5 | 110 | 175 | 25 | 22.2 | 17 |
| Example 6 | 115 | 210 | 26 | 23.2 | 17 |
| Example 7 | 118 | 310 | 26 | 23.5 | 17 |
| Example 8 | 112 | 210 | 25 | 21.0 | 18 |
| Comparative Example 1 | 74 | 150 | 20.6 | 13.9 | 14.5 |
| Comparative Example 2 | 149 | 100 | 28.4 | 24.8 | 14.3 |
| Comparative Example 3 | 113 | 100 | 18 | 17.5 | 17 |

A: Tensile strength
B: Index of resistance to penetration
C: Tear strength
D: Bending resistance
E: Capacity for holding electrolyte under pressure Industrial Applicability The alkaline battery separator of the present invention contains the constituent fibers having an average fiber length of 10 mm or more, which is longer than that of the fibers contained in a conventional separator prepared by a wet-laid method. Therefore, the dividable composite fibers can be effectively divided, and the separator has an excellent electrolyte-holding capacity. Because the average fiber length is long, fibers can be densely entangled. Further, the densely entangled fusible fibers are fused, and therefore, the separator has an excellent tensile strength, tear strength and bending resistance, and thus can be used to stably prepare a battery. The high-strength fibers are also densely entangled, and therefore, it is difficult for a flash of an electrode to penetrate the separator and cause a short circuit.

Although the present invention has been described with reference to specific embodiments, various changes and modifications obvious to those skilled in the art are deemed to be within the spirit, scope, and concept of the invention.

We claim:

1. An alkaline battery separator comprising a hydrophilic nonwoven fabric obtainable from a fiber web prepared by a wet-laid method from
   (1) dividable composite fibers capable of producing polyolefin fine fibers, (2) high-strength fibers having a single-fiber strength of 5 g/denier or more, and (3) fusible fibers containing at least on a surface thereof a resin component having a melting point lower than a melting point of said dividable composite fibers and lower than a melting point of said high-strength fibers,
   by dividing the dividable composite fibers, entangling the fibers, and fusing the fusible fibers, to obtain a heat-fused and entangled nonwoven fabric, and imparting a hydrophilic property to the resulting heat-fused and entangled nonwoven fabric; wherein an average fiber length of the constituent fibers of the hydrophilic nonwoven fabric is 10 mm or more.

2. The alkaline battery separator according to claim 1, wherein an average fiber length of each of said dividable composite fibers, said high-strength fibers, and said fusible fibers is 10 mm or more.

3. The alkaline battery separator according to claim 1, wherein an average fiber length of constituent fibers of said hydrophilic nonwoven fabric is 10 to 25 mm.

4. The alkaline battery separator according to claim 1, wherein said polyolefin fine fiber is polyethylene, polypropylene, polymethylpentene, ethylene-propylene copolymer, ethylene-butene-propylene copolymer, or ethylene-vinyl alcohol copolymer fiber.

5. The alkaline battery separator according to claim 1, wherein said dividable composite fiber is a polyolefin dividable composite fiber capable of only producing one or more polyolefin fine fibers.

6. The alkaline battery separator according to claim 5, wherein constituent resin components of said polyolefin dividable composite fiber are a combination of polypropylene and high-density polyethylene.

7. The alkaline battery separator according to claim 5, wherein constituent resin components of said polyolefin dividable composite fiber are a combination of ethylene-vinyl alcohol copolymer and polypropylene.

8. The alkaline battery separator according to claim 1, wherein said dividable composite fiber is a combination of a first polyolefin dividable composite fiber capable of producing ethylene-vinyl alcohol copolymer fine fibers and one or more other polyolefin fine fibers, and a second polyolefin dividable composite fiber capable of only producing one or more polyolefin fine fibers excepting ethylene-vinyl alcohol copolymer fine fibers.

9. The alkaline battery separator according to claim 1, wherein said dividable composite fibers account for a 35 to 50 mass % with respect to a total mass of said dividable composite fibers, said high-strength fibers and said fusible fibers.

10. The alkaline battery separator according to claim 1, wherein said high-strength fiber is a polypropylene or polyethylene fiber.

11. The alkaline battery separator according to claim 1, wherein said high-strength fiber is a polyethylene fiber having a single-fiber strength of 25 g/denier or more.

12. The alkaline battery separator according to claim 1, wherein said high-strength fibers account for a 30 to 45 mass % with respect to a total mass of said dividable composite fibers, said high-strength fibers and said fusible fibers.

13. The alkaline battery separator according to claim 1, wherein said fusible fiber contains polyethylene, polypropylene, polymethylpentene, ethylene-propylene copolymer, or ethylene-butene-propylene copolymer, as said resin component having a melting point lower than a melting point of said dividable composite fiber and lower than a melting point of said high-strength fiber.

14. The alkaline battery separator according to claim 13, wherein said fusible fiber is a wholly fusible fiber consisting essentially of a polyolefin fusible component, or a partially fusible fiber containing two or more resin components and carrying a polyolefin fusible component on a fiber surface.

15. The alkaline battery separator according to claim 1, wherein said fusible fibers account for a 20 to 35 mass % with respect to a total mass of said dividable composite fibers, said high-strength fibers and said fusible fibers.

16. The alkaline battery separator according to claim 1, wherein the treatment used to impart said hydrophilic property is a sulfonating treatment, a treatment with fluorine gas, a graft polymerization treatment with vinyl monomers, a treatment with a surface-active agent, a treatment used to adhere hydrophilic resins, or a discharging treatment.

17. A process for producing an alkaline battery separator comprising steps of:
    substantially uniformly admixing (1) dividable composite fibers capable of producing polyolefin fine fibers, (2) high-strength fibers having a single-fiber strength of 5 g/denier or more, and (3) fusible fibers containing at least on a surface thereof a resin component having a melting point lower than a melting point of said dividable composite fibers and lower than a melting point of said high-strength fibers, by a wet-laid method, to form a fiber web, wherein an average fiber length of the constituent fibers of said fiber web is 10 mm or more; carrying out a dividing of the dividable composite fibers, entangling of the fibers, and a fusing of the fusible fibers, in any sequential order, to obtain a heat-fused and entangled nonwoven fabric; and then,
    imparting a hydrophilic property to the resulting heat-fused and entangled nonwoven fabric.

18. The process according to claim 17, wherein said fiber web is heated to obtain a pre-fused nonwoven fabric; the resulting pre-fused nonwoven fabric is fluid-entangled; and the resulting fluid-entangled nonwoven fabric then fused to obtain a heat-fused and entangled nonwoven fabric.

19. The process according to claim 17, wherein the treatment used to impart said hydrophilic property is a sulfonating treatment, a treatment with fluorine gas, a graft polymerization treatment with vinyl monomers, a treatment with a surface-active agent, a treatment used to adhere hydrophilic resins, or a discharging treatment.

* * * * *